United States Patent
Bartlett et al.

(10) Patent No.: US 8,805,651 B1
(45) Date of Patent: Aug. 12, 2014

(54) PROPERTIES, INSTRUMENTATION AND AUTOMATIC SCALING FOR SIGNALS IN A MODELING ENVIRONMENT

(75) Inventors: Andrew C. Bartlett, Westborough, MA (US); Pieter J. Mosterman, Framingham, MA (US)

(73) Assignee: The Mathworks, Inc., Natick, MA (US)

( * ) Notice: Subject to any disclaimer, the term of this patent is extended or adjusted under 35 U.S.C. 154(b) by 1039 days.

(21) Appl. No.: 11/405,027

(22) Filed: Apr. 14, 2006

(51) Int. Cl.
*G06F 17/50* (2006.01)

(52) U.S. Cl.
USPC .................................................. 703/2

(58) Field of Classification Search
CPC .................................................. G06F 17/5022
USPC .................................................. 703/2, 13, 22
See application file for complete search history.

(56) References Cited

PUBLICATIONS

Wonyong Sung, "An automatic scaling method for the programming of fixed-point digital signal processors," Circuits and Systems, 1991., IEEE International Sympoisum on , vol., no., pp. 37-40 vol. 1, Jun. 11-14, 1991 URL: http://ieeexplore.ieee.org/stamp/stamp.jsp?arnumber=176267&isnumber=4470.*

National Instruments, LabVIEW user manual, Apr. 2003, 349 pages.*

Mathworks, Matlab Using Simulink 3, 1998, 605 pages.*

* cited by examiner

*Primary Examiner* — Kamini S Shah
*Assistant Examiner* — Luke Osborne
(74) *Attorney, Agent, or Firm* — Harrity & Harrity, LLP

(57) ABSTRACT

A method and system are provided for deriving a property value of a data type in a graphical modeling environment. A graphical model in the graphical modeling environment includes at least one signal having a data type having a precision property, a minimum data value property, or a maximum data value property. These properties may be defined by a user of the graphical modeling environment. The graphical modeling environment may also include instrumentation and diagnostics for signals. Heuristics and algorithms may be provided for auto scaling and selection of data types for signals.

51 Claims, 9 Drawing Sheets

| Signal U(k) | Maximum | Minimum |
|---|---|---|
| Pre-Set | + 140 | - 40 |
| Derived | + 10 | - 10 |

TABLE 1

Fixed Point Data Table

Precision
Scaling
Minimum Value
Maximum Value
Signed
Word Length
Fraction Length
get value ( )
get value ( )

*Fig. 7*

| Signal Name | Data Type | Focal Length |
|---|---|---|
| Focus | Double | " X " |

First Signal Type

| Signal Name | Data Type | Mass |
|---|---|---|
| Laser Pickup | Double | " M " |

Second Signal Type

| Signal Name | Data Type | Tracking Speed |
|---|---|---|
| Tracking | Double | " RPM " |

Third Signal Type

PROPERTIES, INSTRUMENTATION AND AUTOMATIC SCALING FOR SIGNALS IN A MODELING ENVIRONMENT

TECHNICAL FIELD OF THE INVENTION

The present invention generally relates to data processing and, more particularly, to improved properties, instrumentation and automatic scaling for signals in a modeling environment.

BACKGROUND

Various classes of graphical models describe computations that can be performed on computational hardware, such as a computer, microcontroller, FPGA, and custom hardware. Classes of such graphical models include time-based block diagrams such as those found within Simulink® from The MathWorks, Inc. of Natick, Mass., state-based and flow diagrams, such as those found within Stateflow® from The MathWorks, Inc. of Natick, Mass., entity flow network diagrams such as those found within SimEvents from The MathWorks, Inc. of Natick, Mass., data-flow diagrams, circuit diagrams, and software diagrams, such as those found in the Unified Modeling Language. A common characteristic among these various forms of graphical models is that they define semantics on how to execute the diagram.

Historically, engineers and scientists have utilized graphical models in numerous scientific areas such as Feedback Control Theory and Signal Processing to study, design, debug, and refine dynamic systems. Dynamic systems, which are characterized by the fact that their behaviors change over time, or the fact that their states change or the fact that their behaviors change due to a system environment, are representative of many real-world systems. Graphical modeling has become particularly attractive over the last few years with the advent of software packages such as Simulink® from The MathWorks, Inc. of Natick, Mass. Such packages provide sophisticated software platforms with a rich suite of support tools that makes the analysis and design of dynamic systems efficient, methodical, and cost-effective.

A dynamic system, either natural or man-made, is a system whose response at any given time is a function of its input stimuli, its current state, the current time, and other input parameters. Such systems range from simple to highly complex systems. Physical dynamic systems include a falling body, the rotation of the earth, bio-mechanical systems (muscles, joints, etc.), bio-chemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, etc.

Professionals from diverse areas such as engineering, science, education, and economics build graphical models of dynamic systems in order to better understand system behavior as it changes with the progression of time. The graphical models aid in building "better" systems, where "better" may be defined in terms of a variety of performance measures such as quality, time-to-market, cost, speed, size, power consumption, robustness, etc. The graphical models also aid in analyzing, debugging and repairing existing systems (be it the human body or the anti-lock braking system in a car). The models may also serve an educational purpose of educating others on the basic principles governing physical systems. The models and results are often used as a scientific communication medium between humans. The term "model-based design" is used to refer to the use of graphical models in the development, analysis, and validation of dynamic systems.

Graphical modeling environments such as Simulink®, assist in simplifying the process of designing, simulating, and implementing dynamic systems. A graphical model is a representation of a real-world system through a graph containing nodes (i.e. blocks) interconnected by arcs (i.e. lines). Blocks are functional entities that perform mathematical operations, transformations or both on the data and information being processed by the system. The lines, often referred to as signals in the art, represent streams of information, such as data, data types, timing information, and control information, flowing into, out of, and between various blocks. Signals in current graphical model environments have a number of properties, such as data dimensions (i.e., signal dimensionality), data type, range of signed and unsigned values, scaling, and precision, amongst other properties. Signal data can be organized into a one-dimensional data structure for example, a vector or can be organized into a two-dimensional data structure, for example, a matrix, or can be organized into a three-dimensional or higher-dimensional data structure.

Graphical modeling environments, such as the technical computing environment of MATLAB® from the MathWorks, Inc. of Natick, Mass., can provide a "model-based design" approach to designing an implementation. The term "model-based design" is used to refer to a model acting as a design. A model-based design may be used as a design specification for an implementation, such as an implementation of an algorithm in hardware circuitry or the implementation of code to run on a computer. A graphical block diagram modeling environment can produce designs in graphical block diagram form to specify computations that can be performed on computational hardware such as a general purpose processor, microcontroller, DSP, FPGA, PLD, or ASIC. That is, a model-based design is well suited for use as a design specification, for the model-based design can drive the building process of an implementation of the design. For instance, the model-based design can act as a specification from which to automatically generate code from a graphical model in a graphical modeling environment.

There are some limitations associated with conventional model-based design tools. For example, the user cannot specify externally known limitations regarding the precision of a signal. For instance, a user cannot specify that a signal represents a temperature reading that is accurate to +/−0.125 degrees Celsius. In addition, a user cannot specify externally known requirements regarding the precision of a signal. For example, suppose that a signal controls the aiming of a laser in a laser printer and there is a design goal to have 600 dots per inch accuracy. Conventional model-based design tools do not provide a mechanism for a user to specify this externally known precision requirement.

An additional limitation of conventional model-based design tools is that they do not allow a user to enter externally known limitations regarding rates of change for a signal and for the derivatives of the signal. For instance, suppose that a user knows that a signal representing the temperature of an engine block never changes faster than degrees per second. With conventional model-based design tools, there is no way of specifying this limitation regarding the rate of change of the signal a priori.

As another example, consider a DC motor that is used to move a power window of an automobile up and down. In its operation, the current that the motor draws may range from −15 Ampere to 15 Ampere. If the measurement instrumentation has a 2% accuracy, the value of the current is known in a range of +/−300 milli-Ampere. The measurement may be coded into a 16 bit representation which, for a range of 30 Ampere would result in a precision of 0.4 milli-Ampere. This measurement may be used in the control of the DC motor voltage so that the window never exerts a force larger than 100 Newton. Again the 16 bit representation may correspond to a higher precision than what the actuator instrumentation is rated for, which may be in the order of +/−2 Newton.

In this DC motor example, the 300 milli-Ampere range as well as the +/−2 Newton range are properties of system behavior that have an external origin, i.e., they are not inherent in the model. Depending on whether they represent design goals or implementation constraints, they can be considered requirements or limitations, respectively. These two different aspects of the design are related to disjoint activities in the overall design process and are part of the opposite ends of the overall design flow. That is, the manner in which limitations arise and are defined is treated different from the manner in which requirements arise and are defined. It is often unclear as to how design practices transfer from limitation to requirement handling and vice versa. With conventional model-based design tools such external requirements and limitations related to precision, range, rate-of-change, etc., cannot be specified.

Model-based design tools provide a limited ability to derive signal properties from other known values. There are a number of derived signal properties that are not available with current model-based design tools. For example, conventional model-based design tools do not allow derived precision limitations to be automatically obtained. Similarly, they do not allow derived precision requirements to be obtained.

Model-based design tools provide certain varieties of instrumentation, such as logging of signal values, logging of simulation maximums and minimums and logging overflow events. Conventional model-based design tools, however, do not provide instrumentation that collects a simulation Nth discrete derivative maximum and/or minimum for signals. That is, conventional model-based design tools cannot collect derived maximum and/or minimum values based on one or more temporal derivative limits of the values. Likewise, conventional model-based design tools cannot capture an Nth temporal derivative. Those skilled in the art will appreciate that as used herein N can be any integer larger than zero(0).

Conventional model-based design tools have limited diagnostic capability. For instance, these conventional model-based design tools do not provide the ability to diagnose failure to meet a design precision requirement or exceeding a design limitation.

Conventional model-based design tools are also limited in automatic scaling techniques that are applied to fixed point signal values to set binary points for the values. These conventional model-based design techniques are also limited in the variety of techniques that are available for the selection of data types for signals.

SUMMARY OF THE INVENTION

The present invention provides a mechanism for specifying externally known precision limitations and externally known precision requirements of signals in a modeling environment. These may be specified, for example, as property values for signal types. The present invention also allows the specification and derivation of maximum and minimum values by signals based in part on temporally derived signal values by setting properties associated with a signal. In addition, the present invention may provide instrumentation and diagnostics for signals. The present invention may also provide intelligence for automatically deriving precision limitations, precision requirements, and/or discrete Nth derivatives maximum and minimum for signals. Still further, the present invention may provide intelligence for performing automatic scaling and selection of data type for signals.

In one embodiment of the present invention, a method performed in a computing device providing a graphical modeling environment is disclosed. Performance of the method provides a first signal type for a signal having a fixed point data type value and derives from the first signal type a value of a precision property of a second signal type for a second signal having the fixed point data type property. The value of the precision property limits representation of a value of the second signal to a desired precision.

Performance of the method can build a graphical model representing a model based design in the graphical modeling environment having at least one signal of the second signal type.

The method can include the steps of receiving on a port of a block in the graphical model the first signal of the first signal type and setting in the block, the format of the value of the second signal based on a precision property of the first signal. The format can include a scaling property defining a slope and bias to represent the value of the second signal. The format can include a fraction length property defining a fraction length of the value of the second signal. The method can include the step of determining in the block, a word length for the value of the second signal.

The method can include the steps of determining a precision of an arithmetic operation performable in the graphical model and automatically setting the format of the value of the second signal based on the precision of the arithmetic operation and the precision property. A result of the arithmetic operation is the value of the second signal.

In one embodiment of the present invention, a computing device for use in practicing a technical computing environment is disclosed. The technical computing to environment is well suited for developing and performing engineering and science related functions. In one aspect of the present invention, the computing device may include one or more computational devices and include an input device for use by a user, a graphical model environment providing a first signal type, and an interface responsive to inputs from the user to direct the graphical model environment to derive from the first signal type a value of a precision property of a second signal type having a fixed point data property. The value of the precision property limits representation of a value of a second signal of the second signal type to a desired precision. The computing device can include a display device for rendering a graphical model having the second signal type.

The graphical model environment provides a block having a structure and operation for processing a first signal representing the first signal type. The block being capable of outputting a signal representing the second signal type at a port of the block and deriving from the first signal type and an operation performed by the block using a data value from the first signal the value of the precision property limiting representation of the value of the second signal of the second signal type to the desired precision. The graphical model environment can report to the user if the value of the precision property conflicts with another precision property value of another signal in a graphical model of the graphical model environment. Further, the graphical model environment can report to the user if the value of the precision property cannot be achieved by a graphical model in the graphical model environment.

In another embodiment of the present invention, a method performed in a computing device providing a graphical modeling environment is disclosed. The method includes the steps of providing a signal type for a signal and receiving from a user the graphical modeling environment input to allow the graphical modeling environment to derive a derived value for the maximum value or a derived value for the minimum value. The method can include the step of providing a graphical model of a model based design having the signal of the signal type.

In another embodiment of the present invention, a computing device for use in practicing a technical computing environment is disclosed. The technical computing environment is well suited for developing and performing engineering and scientific related functions. The computing device includes an input device for use by a user, a graphical modeling environment providing a first signal type, and an interface responsive to inputs from the user to direct the graphical model environment to derive at least one of a maximum value or a minimum value for a signal of the first signal type having a fixed point data type property based on values of the fixed point data type observed during propagation of the signal in the graphical modeling environment. The computing device can include a display device for rendering a graphical model having the first signal type.

The graphical modeling environment can provide a block having a structure and operation for processing the first signal representing the first signal type. The block being capable of deriving at least one of the maximum value or the minimum value for the signal of the first signal type. The block being capable of deriving at least one of the maximum value or the minimum value for the signal based on values observed during propagation of the signal in the graphical modeling environment and based on a temporal observation of the signal.

BRIEF DESCRIPTION OF FIGURES

An illustrative embodiment of the present invention will be described below relative to the following drawings in which like reference characters refer to the same parts throughout the different views.

FIG. 7 illustrates more detail of the exemplary signals illustrated in FIGS. 3-5.

DETAILED DESCRIPTION

Figure 1:
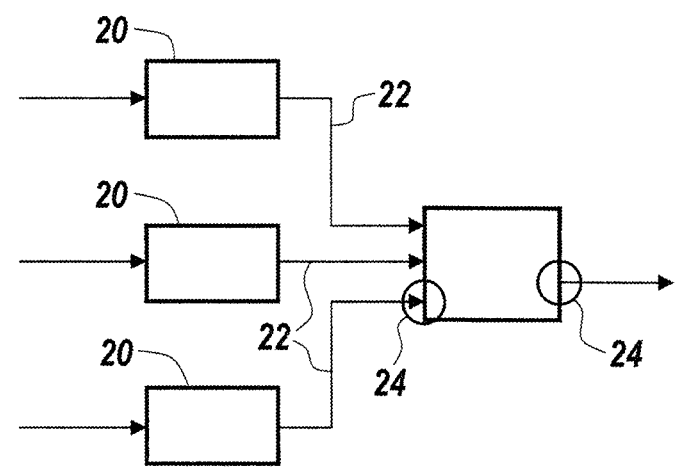
FIG. 1 illustrates components of an exemplary graphical model environment.

The illustrative embodiment of the present invention extends graphical and textual based tools so that novel properties can be specified when constructing a model, such as a graphical model or a textual model. In particular, novel design signal properties may be specified, such as a design precision limitation, a design precision requirement and a derivative maximum and/or minimum. The illustrative embodiment also describes ways to propagate these novel properties throughout a model. The illustrative embodiment provides a unique instrumentation approach for collection of simulation derivative maximum and/or minimum. Diagnostics are provided to identify when the design precision requirements and limitations are not satisfied. The illustrative embodiment also provides automatic configuration of data type and scaling for signals. The graphical and textual based tools of the present invention are well suited for use in graphical and textual modeling environments when designing and constructing a model therein.

Before starting the discussion below, it is helpful to clarify the meaning of the term "signal." A signal is used herein as representing systems of values. A signal type refers to a signal that is a member of a class or classes of signals. That is, a signal is a set of values that are accessible from different entities in a graphical modeling environment that are connected by a line, a referencing label, or other means to indicate the shared accessibility. Signals can take on different values as the model executes. Signals have properties such as dimensionality, data type, sample rate, value range, value precision, value precision limitation, etc.

In more detail, at each time instant, the value of a signal is in general an N-dimensional array, where N can take on any positive integer value including 0. For example, a scalar signal is represented by a scalar value at each time instant. Thus at time $t_0$, a scalar signal value could be 3.14. Likewise, a 1-dimensional signal is represented as a vector at each time instant. For example at time $t_0$, a 1-dimensional signal value could be $$\begin{bmatrix} 3 \\ 4.2 \\ 5 \end{bmatrix},$$

further, a 2-dimensional signal is represented as a matrix at each time instant. For example at time $t_0$, a 2-dimensional signal could be $$\begin{bmatrix} 2 & 4 \\ 2.4 & 4.2 \\ 2.7 & 7.4 \\ 3.1 & 1.3 \end{bmatrix}.$$

Such a 2-dimensional signal could be implemented as a 1-dimensional row major or column major vector.

Still further, an "N"-dimensional signal may be represented as an N-dimensional array at each time instant, which could be implemented in a lower or higher dimensional representation as well.

Additionally, signals can be constructed in a hierarchical manner, e.g., as buses. One result of constructing signals in this manner would be that, for example, an array could have an array or matrix as an element.

In addition, associated with each dimension of a signal is a size. For example, the size of the 1-dimensional signal discussed above is three. The 2-dimensional signal discussed above has a size of four for the first dimension and a size of two for the second dimension. Those skilled in the art will appreciate that a scalar can be interpreted as and converted to a 1-dimensional vector and associated with a signal.

A signal of a block diagram model according to the present invention has associated therewith a data type. The data type includes one or more properties such as a precision limit, a precision requirement, and a temporal Nth derivative maximum or minimum value, or any such combination of properties that can be specified when constructing a model and during model execution, and, in turn, propagated throughout the model. Hence, these properties are referred to as design precision limit, design precision requirement, and design Nth derivative maximum and minimum, herein.

As used herein, the term "requirement or requirements" refer to the behavior or behaviors that the design is prescribed to exhibit. Requirements are provided by a high level specification of the behavior of the design.

As used herein, the term "limitation or limitations" refer to the behavior or behaviors that the design cannot attain. Limitations are obtained when a more detailed version of the design is produced.

In a characteristic design approach, a design moves through a series of stages. The output of each of those stages is specifications that form the input, the requirements, of the next stage. Limitations are passed in the opposite direction and are of a different nature. Most likely, limitations are produced by engineers with a different background, they require different analyses, they have different tool support and they rely on different technology, and they are subject to different mechanisms in the overall design process.

The illustrative embodiment of the present invention facilitates the use of precision limitations, precision requirements, and temporal Nth derivative maximum or minimum values, or any combination of such properties for signals. The method and system of the illustrative embodiment allows a programmer in the graphical modeling environment to define a first signal type having a data type design precision limitation, a data type design precision requirement, and a data type design derived maximum value, minimum value or both, that propagate. The representable maximum and minimum define the limits of the data value representation, while the design precision property defines the distance between successive numbers in the representation, the design precision limitation property defines a precision limitation of the data value representation.

In one embodiment, the minimum and maximum values of the higher order derivatives with respect to time can be set. In one aspect of the embodiment, this could be implemented in a textual environment. For example, a Simulink Signal object can be created by typing:
\>\> mySignal=Simulink.Signal
at a command prompt. This may result in a signal mySignal with the following attributes:

```
mySignal =
Simulink.Signal (handle)
             RTWInfo: [1×1 Simulink.SignalRTWInfo]
         Description: ''
            DataType: 'auto'
                 Min: -Inf
                 Max: Inf
      Derivatives Min: [-Inf]
      Derivatives Max: [Inf]
            DocUnits: ''
          Dimensions: -1
          Complexity: 'auto'
          SampleTime: -1
        SamplingMode: 'auto'
        InitialValue: ''
```

The minimum and maximum values of the derivatives with respect to time can now be set by entering values for the Derivatives Min and Derivatives Max attributes. For example, when Derivatives Min is set to [-Inf 4 -Inf], the minimum value of the first derivative with respect to time is unlimited, the minimum value of the second derivative is 4, and the minimum value of the third derivative is unrestricted again.

When Derivative Max is set to [Inf 340 10], the maximum value of the first derivative with respect to time is unrestricted, the maximum value of the second derivative with respect to time is 340 and the maximum value of the third derivative with respect to time is 10.

The resulting Simulink signal object mySignal then becomes:

```
mySignal =
Simulink.Signal (handle)
             RTWInfo: [1×1 Simulink.SignalRTWInfo]
         Description: ''
            DataType: 'auto'
                 Min: -Inf
                 Max: Inf
      Derivatives Min: [-Inf  4  -Inf]
      Derivatives Max: [Inf  340  10]
            DocUnits: ''
          Dimensions: -1
          Complexity: 'auto'
          SampleTime: -1
        SamplingMode: 'auto'
        InitialValue: ''
```

In one aspect of the embodiment, consistency checking is applied to ensure that the provided bounds on minimum values are less than the bounds on maximum values.

In another aspect of the embodiment, this information can be entered through a graphical user interface.

In yet another embodiment, a fixed-point object such as the 'fi' object in MATLAB® can be used in a similar manner. The fi object may have requirement and limitation precision and ranges set and properties such as Nth temporal derivatives can be propagated along the computation that are performed in a textually or graphically specified sequence.

Those skilled in the art will appreciate that the teachings of the present invention are well suited for use in a graphical modeling environment, a textual modeling environment, or a modeling environment that includes both graphical modeling features and textual modeling features.

For the case of a fixed point data type, the representable maximum and minimum and precision of the fixed point data type depends on the word length and the scaling. To specify how values of a fixed point data type are quantized, three quantities can be used. The first quantity is word length, and is typically expressed in bits. The second quantity is signedness, which specifies whether the data type is signed or unsigned. The third quantity is fraction length, and is typically expressed in bits. Fraction lengths used to represent numeric values can be any positive or negative integer, including larger than the associated word length for the value. An alternative to fraction length is a specification of scaling that includes a slope and bias.

Word length and fraction length combine to make the format for a fixed point data type, where the word length is the number of bits used to represent a value and the fraction length specifies, in bits, the location of the binary point in the fixed point representation.

Fraction length is defined as the number of fractional bits (bits to the right of the binary point) and is true only when the fraction length is positive and less than or equal to the word length. However, it is also possible to have fixed point formats where the fraction length is greater than the word length or negative. In these cases, the fraction length is no longer the number of bits to the right of the binary point.

One manner to consider the fixed point data type format of (word length, fraction length) is the representation of a fixed point value as a weighted sum of powers of two driven by the fraction length, or the two's compliment representation of the fixed point number. For example, the format [B L], where B represents the word length and L represents the fraction length, and the fraction length L can be positive, negative, 0, greater than B, or less than B (B and L are always integers and B is always positive.) Given a binary string b(1) b(2) b(3) . . . b(B) to determine the two's compliment values of the string in the format described by [B L], the value of the individual bits in the binary string are used in Equation one below, where b(1) is the first binary bit (and the most significant bit), b(2) is the second, and so on up to b(B). The decimal numeric value that those bits represent is given by:

$$\text{Value} = -b(1)*2^{(B-L-1)} + b(2)*2^{(B-L-2)} + b(3)*2^{(B-L-3)} + \ldots + b(B)*2^{(-L)} \quad (1)$$

where L, the fraction length, represents the negative of the weight of the last, or least significant bit. L is also the step size or the precision provided by a given fraction length.

For example, when all of the bits in the binary string are zero except for the LSB, the value represented by the bit string is given by $2^{(-L)}$. If L is negative, for example, L=−16, the value is $2^{(16)}$. Thus, the smaller step between numbers that can be represented in a format where L=−16 is given by $1 \times 2^{(16)}$ (or the right most term in equation 1 above), which is 65536. Note, precision does not depend on the word length.

As another example, if the word length of a fixed point data type is set to 8 bits, the decimal value 12 is represented in binary by 00001100. The decimal equivalent of 00001100 indicates a [8 0] data format representation, that is, the word length is 8 bits and the fraction length is 0 bits. Accordingly, the step size or precision (the smallest difference between two adjacent values) in the format [8 0] is $2^0=1$. As another example, if an operation carried out by a block in a graphical modeling environment keeps the upper five bits of a value and discards the three lower bits, the resulting precision after removing the three right most bits comes from the weight of the lowest remaining bit, or the fifth bit from the left which is $2^3=8$ so the format of the integer data type in this example would be [5 −3]. In this format, the steps size is 8 and therefore the format cannot represent numbers that are between multiples of 8. As one further example, for instance, use of the format [16 0] as the output format for a 32 bit result from a sum operation when the original format is [32 0] takes the lower 16 bits from the results. Using a format [16 −16] takes the higher 16 bits of the 32 bit results.

Those skilled in the art will appreciate that the present invention is not limited to use with signals of a fixed-point data type. The present invention may in many respects be practiced with signals of floating point data types.

Those skilled in the art will appreciate that inherent to a fixed point quantitization scheme is the numbers spanning the representable maximum and minimum range of the numbers that can be applied to it. For example, for a signed fixed point number with word length B and fraction length L, the inherent dynamic range is from $-2^{B-L-1}$ to $2^{B-L-1}-2^{-L}$. For an unsigned fixed point number with a word length B and fraction length L, the numbers may span from 0 to $2^{B-L}-2^{-L}$. In either case, the precision is $2^{(-L)}$. The illustrative embodiment is concerned with defining and propagating in a graphical modeling environment a design precision limitation property, a design precision property, a derivable maximum value, a derivable data minimum value, an Nth temporal derivative, or any such combination of properties for a fixed point data type as described in more detail below.

The illustrative embodiment of the present invention enables in a graphical modeling environment, for the user to specify one or more of the following for a signal of a data type. The user can specify a design precision limitation for the data type, can specify a design precision requirement for the data type, and the user can specify a derivable maximum value, a derivable minimum value, or both for the data type. Further, the block diagram model built in a graphical modeling environment can be produced to represent a design for the implementation of code, either software or hardware description, on a multiple component computational hardware device.

A signal of the present invention having a data type can have associated therewith a precision limitation for a value of the data type. The precision limitation of the data type value according to the present invention is distinct from the concept of the scaling value for the least significant bit of a binary representation of the fixed point data type value. For example, an A/D converter may have a precision to 14 bits, but a sensor providing an analog input to the A/D converter may have a lower analog precision that corresponds to the digitization in 14 bits. Additionally, a signal can be computed using low precision values and hold or reserve higher precision bits in order to prevent jitter in downstream calculations.

The specification or definition of a design precision limitation as well as requirement property is useful for automatically deriving other signal properties such as word length, scaling, or both.

A graphical model of a dynamic system is represented schematically as a collection of blocks interconnected by lines that are either visible on a display (i.e., graphical connection), by lines that are not visually displayed, or both. The lines represent the connection as opposed to the signals themselves. Each block represents an elemental dynamic system. A line emanating at one block and terminating at another can signify that the output of the first block is an input to the second block that an output of the second block is an input to the first block, or a bi-directional signal between a bi-directional port of the first block and a bi-directional port of the second block. Each distinct input or output on a block is referred to as a port. Alternatively, a line can signify communication characteristics such as a buffer with fixed or variable size and communication protocol such as 'last in first out' (LIFO) and 'first in first out' (FIFO) or any other protocol. Still further, a line can also represent a transition between two states in a state transition diagram or signify some other relation between the entities it is connected to which, in general, could be more than two.

Signals correspond to the time-varying quantities represented by each line connection and in one embodiment of the present invention are assumed to have values at each time instant. The source block of a signal writes to the signal at a given time instant when its system equations are solved. The destination blocks of this signal read from the signal when their system equations are being solved. FIG. 1 illustrates exemplary components of a graphical model in a graphical modeling environment. The graphical model includes a plurality of blocks 20, signals 22 and ports 24 that are interconnected. Those skilled in the art will recognize that the term "blocks" does not refer exclusively to elemental dynamic systems but may also include other modeling elements that aid in readability and modularity of graphical models.

Figure 2:
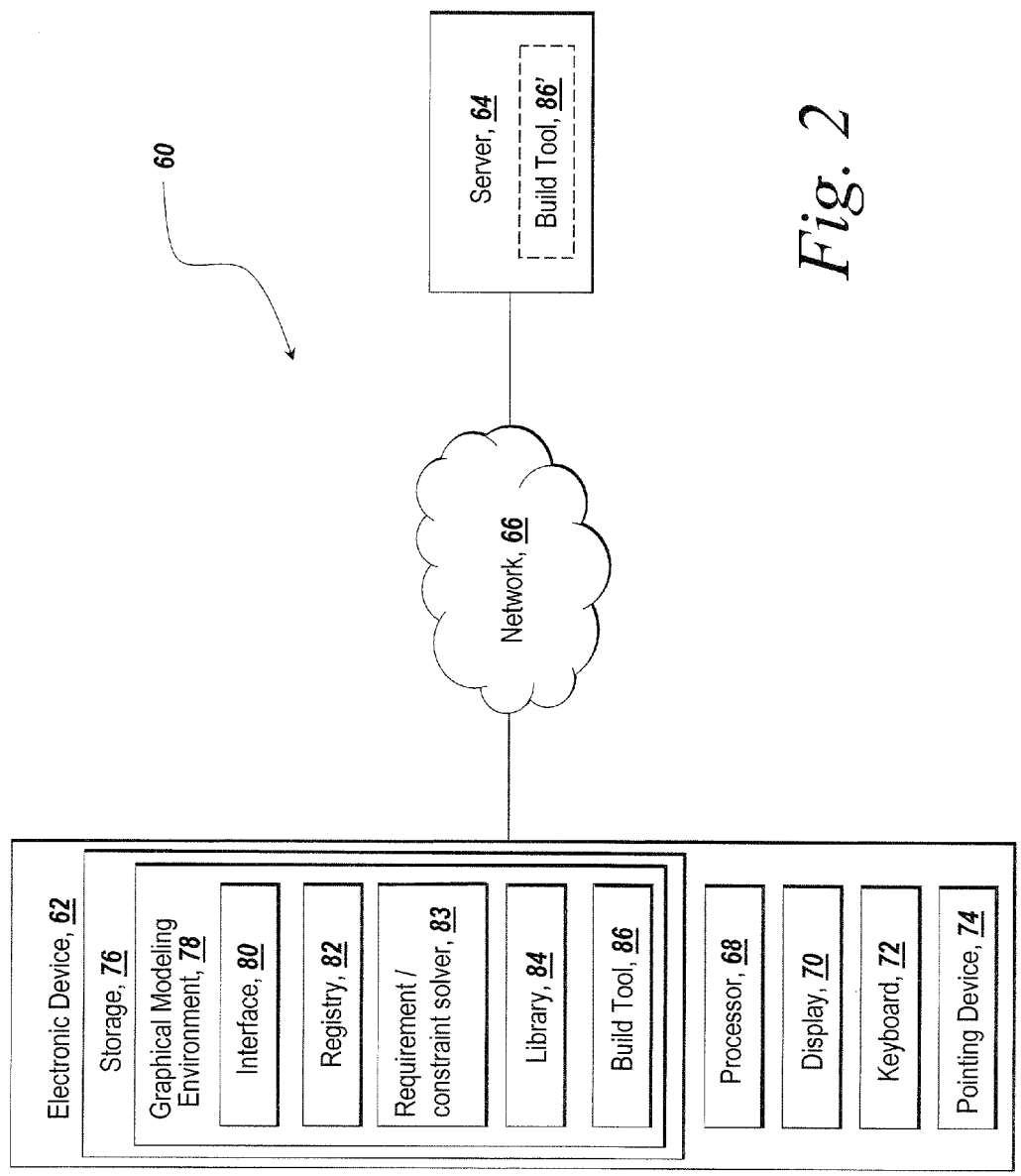
FIG. 2 illustrates an environment suitable for practicing the illustrative embodiment of the present invention.

The generation or creation of the graphical model illustrated in FIG. 1 is accomplished, for example, using system 60 illustrated in FIG. 2. System 60 includes a computing device 62, a network 66, and optionally, another computing device for example server 64. Computing device 62 includes, amongst other hardware and software components, GUI tools 80 in graphical model environment 78. One example of a graphical model environment is Simulink® from The MathWorks, Inc. of Natick, Mass. The suite of GUI tools allows users to draft a graphical model on one or more corresponding windows. The GUI tools 80 can include a block palette, wiring line connection tool (i.e. signal connector tool), annotation tool, formatting tool, property editing tool, save/load tool and publishing tool, and other tools depending on a user's need and the graphical modeling environment 78.

The block palette is a library 84 of pre-defined blocks available to the user when building or editing a graphical model. Individual users may be able to customize this palette to: (a) reorganize blocks in some custom format, (b) delete blocks they do not use, and (c) add custom blocks they have designed. The palette allows blocks to be dragged through some human-machine interface (such as a pointing device 74 or keyboard 72) from the palette on to the window (i.e., model canvas). The graphical version of the block that is rendered on the canvas is called the icon for the block. There may be different embodiments for the block palette including a tree-based browser view of all of the blocks. Further details of system 60 are discussed below in more detail with reference to FIG. 2.

The wiring line connection tool (not shown) allows users to draw lines, which in one embodiment of the present invention may be directed, representing signals that connect the ports of blocks in the model's window. Lines may also be added through various mechanisms involving human-machine interfaces such as a mouse or a keyboard. Simulink® also provides various forms of auto-connection tools that connect blocks automatically on user request to produce an aesthetically pleasing layout of the graphical model (especially those with high complexity with large numbers of blocks). The annotation tool allows users to add notes and annotations to various parts of the palette for a graphical model. The formatting tool enables users to perform various formatting operations that are generally available on any document editing tool. These operations help pick and modify the various graphical properties of the graphical model (and constituent blocks) such as include font-selection, alignment & justification, color selection, etc.

The graphical model and all the blocks within the graphical model generally have a set of functional properties that are relevant for the execution of the model and code-generation from the model for execution by a computational hardware device outside the graphical modeling environment. The property editing tool provides GUIs that allow these properties to be specified and edited. The save/load tool allows a created graphical model to be saved. The saved model can be reopened in the editor at some later juncture through a load mechanism. Simulink® also allows users to save blocks including pre-constructed subsystems into a separate class of block-diagrams called libraries. Such libraries facilitate reuse of the same block in a number of other block-diagrams. The load/save mechanism is specially equipped to handle loading and saving of blocks in a block-diagram that actually reside in libraries.

A typical base class for a block may be represented as:

```
class Block {
    public:
        // Access methods for setting/getting block data
        ...
        // Methods for block editing
        virtual ErrorStatus BlockDrawIcon( );
        virtual BlockParameterData BlockGetParameterData( );
        ...
        // Methods for block compilation
        ...
        // Methods for block execution
        ...........................................
        virtual ErrorStatus BlockOutput( ) = 0;
        virtual ErrorStatus BlockDerivative( ) = 0;
        virtual ErrorStatus BlockUpdate( ) = 0;
        ...
    private:
        BlockGraphicalData blkGraphicalProperties;
        BlockFunctionalData blkFunctionalProperties;
        BlockCompiledData blkCompiledProperties;
        BlockExecutionData blkExecutionData;
        ...
};
```

Although the example of the data structure above is written in C++, those skilled in the art will recognize that equivalent data structures written in other languages, such as a structured language or another object-oriented language may also be used. The major data fields of the block data structure fall into four categories. Exemplary fields include, but are not limited to a graphical property's field, a functional property's field, a compiled property's field and an execution data field.

The graphical property's field is responsible for storing information relevant for graphical rendering of the block within its parent graphical model's GUI. Properties specific to the block icon such as font, color, name, and icon-image are stored in this field. It should be noted that modifying these properties does not affect the dynamics of the model using this block. The functional property's field is responsible for specifying block properties that may potentially affect the dynamics of the model using this block. These properties are specified for the block as a whole and the input and output ports of the block. Examples of block properties include block sample times and restrictive flags. Block sample times specify if the block corresponds to an elemental, continuous, discrete, or hybrid dynamic system. If the block is an elemental discrete-time system, then the property specifies the spacing between time instants at which the block response should be traced. A restrictive flag disallows the use of blocks in certain modeling contexts. For example, one may impose the restriction that there may only be one instance of given block in a model.

Properties of block ports specify properties of the information that is either available to or produced at that port. For example, Block port properties are listed in Table I below.

TABLE I

Dimensions
Data Types
Sample Rates
Direct Feed Through
Complexity

Dimension properties are individual dimension sizes of a multi-dimensional array that are used as a container for data elements. Data type properties are the data type of each element of data in the data container. A sample rate property specifies how and when the signal corresponding to an input or output port will be used. The port sample times may sometimes be used to implicitly infer the block's sample time. The direct feed through property is specified only for input ports and indicates whether the Output, the GetTimeOfNextHit, or both equations of the block are a function of the given input. This property helps in determining the sequence in which block methods should be executed while executing the graphical model. A complexity property is a flag to specify if each data element is real or complex.

The compiled property field of the block data structure holds the properties of the block and its ports that mirror the functional properties listed above. This field is filled in during graphical model compilation by utilizing the functional properties of the block in conjunction with the functional and compiled properties of the blocks that are connected to it. This process of determining the compiled properties from the functional properties is termed property propagation or signal propagation. Property propagation is described in greater detail below in the section on graphical model compilation. The execution data field is mainly responsible for storing the memory locations that are going to serve as sources for block inputs, outputs, states, parameters, and other work areas during execution of blocks.

The block data structure also has a set of associated methods that may be categorized as access methods to data fields, methods used in editing, methods used in compilation and methods used in execution. Access methods to data fields help in setting and getting the various data fields of the block. Methods used in editing are called by the graphical model editor in order to render the block appropriately in the GUI of its parent graphical model. For instance, this set of methods may include a BlockDrawIcon method that determines the shape the block icon has on the GUI. Methods used in compilation are methods that are called by the graphical model compilation engine. They help validate the connections of the block to other blocks on the graphical model.

The methods used in execution include a number of different run-time methods that are required for execution. These include the BlockOutput, BlockUpdate, BlockDerivative methods that realize the Output, Update, and Derivative equations often found in the context of dynamic systems. In addition to these methods, Simulink® includes several other run-time methods, such as the Jacobian, Projection, ZeroCrossings, Enable, Disable, Initialize, EvalParams (check and process parameters), and GetTimeOfNextHit methods. It should be noted that there is no explicit method for algebraic loops because these are represented and processed in a different manner.

Once a graphical model has been constructed using the editor, an execution engine allows the model to be solved in order to trace the system outputs as a function of time. The solution of the model, which may be referred to as model execution, is carried out starting at a user-specified time for a set of user-specified inputs. Simulation proceeds in three major stages: compilation, link, and the simulation loop. An optional fourth major stage can include code generation of code such as C and C++ as well as a hardware description language such as VHDL and Verilog.

Referring again to FIG. 2, depicted is an environment suitable for practicing an illustrative embodiment of the present invention. The computer system 60 includes the computing device 62, the network 66, such as the Internet, an intranet, or other suitable network either wired, wireless or a hybrid of wired and wireless, and, optionally, the server 64 or other computing device. The computing device 62 includes a microprocessor 68 for executing various instructions from an executable program and controlling various hardware and software components. The computing device 62 also includes a display device 70 for use in rendering textual and graphical images, a storage device 76 for storing various items such as an interface 80, and a graphical model environment 78.

The storage device 76 can also store a registry 82 for registering various properties or characteristics of blocks and signals with the graphical model environment 78, a requirement/constraint solver 83 and a library 84 to serve as a repository of block types and signal types that currently exist in the graphical modeling environment 78. The registry 82 in conjunction with the interface 80 allows a user to define and register with the graphical model environment 78 signals that have a precision limit, precision requirement, a derived maximum value, a derived minimum value, or any combination of such properties which can be used as a block diagram executes in the graphical modeling environment 78 to determine a precision limitation of a data value, determine a precision requirement of a fixed point data value, derive a downstream minimum or maximum value of a signal having a fixed point data type, auto scale a downstream a data value, provide a warning of a downstream precision error before occurrence of the error, determine a precision of a downstream signal, or determine a word length or fraction length of a down stream signal. Those skilled in the art will appreciate that the illustration of the interface 80, the registry 82, the library 84, is merely illustrative and these elements can be physically or logically located in the graphical modeling environment 78 or outside of the graphical modeling environment 78.

The requirement/constraint solver 83 is able to monitor signal properties, constraints, limitations, or requirements amongst two or more signal types to ensure any change to a related property, requirement, limitation, or constraint on one signal type is carried through, if necessary, on one or more other signal types. That is, an engineer, scientist or other like overseer of a modeling process or the design of a model or system can define or select one or more signal types and relate some property, requirement, limitation, or constraint on one signal type to a property, requirement, limitation, or constraint on another signal type with the interface 80. In this manner, the requirement/constraint solver 83 can receive through the interface 80 the related properties, requirements or constraints for the two or more signal types and monitor the related properties, requirements or constraints to ensure a change in one is carried through to the related other, if necessary. The operation and function of the requirement/constraint solver 83 is discussed below in relation to FIGS. 10-14.

In an exemplary embodiment, the graphical modeling environment 78, such as a graphical modeling environment like Simulink® from the MathWorks, Inc. of Natick, Mass., provides a graphical and interactive environment by which engineers and other designers can use a model-based design approach to design and develop code for a computational hardware device. With a model-based design approach, the graphical modeling environment 78 allows a block diagram model to be an implementation specification for automatically generating code. As such, design changes to the model can be quickly updated in the design model, evaluated by simulation and then automatically reflected in the generated code.

The graphical modeling environment 78 can include a code build tool 86 to generate code for the implementation of the design represented by a block diagram model. In brief overview, the code build tool 86, such as a code building tool like Real-Time Workshop® from the MathWorks, Inc. of Natick, Mass., generates and executes stand-alone source code, such as the C programming language, for models created with the graphical modeling environment 78, such as a graphical modeling environment 78 provided by Simulink®. The code build tool 86 can generate source code for the model or for sub-systems of the model, compile the source code into object code, and build an executable program. The code may be designed to run on any processor, microprocessor, operating system, computational hardware or component of a computational hardware device. Additionally, the code may be customized to run on a specific target hardware platform generated based on a hardware configuration such as, field programmable gate arrays and application specific integrated circuits.

The code build tool 86 obtains a block diagram model from the graphical modeling environment 78 along with other information and translates the blocks of the block diagram model to build or generate source code representing the functionality of the configured blocks in the block diagram model. The other information can be held, for example, in one or more files and include, templates, commands, input parameters, configuration data, source code, data and class definitions, and any other like information. The computing device 62 also includes a keyboard 72 and a pointing device 74, such as a mouse, trackball, or lightpen. The graphical modeling environment 78 will be described below for illustrative purposes based on Simulink® from The MathWorks, Inc. of Natick, Mass. Nevertheless, those skilled in the art will appreciate that the principles and concepts described below are equally applicable to other graphical modeling environments, such as LabView, System View, Signal Processing Workstation, HyperSignal, COSSAP, TargetLink, Ptolemy and other like graphical model environments that includes Design Compiler by Synopsys and Incisive by Cadence. The interface 80 programmatically registers the various signal data precision requirements, precision limitations, and the like defined by a user with the registry 82 and thus the graphical modeling environment 78.

Definitions of signal classes, and hence a complete signal class inheritance hierarchy, may be accomplished explicitly in the context of the graphical modeling environment by use of a registry or other means to retain class definition declarations. Alternatively, the definitions are declarable and retained in a separate environment that is equipped with interfaces to access the definitions directly from the graphical modeling environment. MATLAB® is an example of an environment in which signal class definitions may be declared and instanced by means of a textual description language and a suitable type repository. Additionally, in some environments, for example, MATLAB® the teachings of the present invention are extendable to dynamic typing.

Nonetheless, those skilled in the art will recognize that other programming applications and environments are well suited to act as a repository or define a signal class hierarchy even if interfaces need to be defined and developed to share class definitions and object instances with the illustrative graphical modeling environment 78. Furthermore, those skilled in the art will recognize that the interface 80 can take the form of a graphical user interface that provides a user of the system 60 with textual and graphical information to allow the user to browse, select, create, and modify the signal classes and the signal sub-classes of the graphical modeling environment 78. Those skilled in the art will appreciate that the interface 80 is also implementable as a command line interface or other suitable interface that allows a user to register a newly defined signal class or signal sub-class (i.e., newly defined signal type) or to define or specify the data dimensionality and size of a signal with the graphical modeling environment 78.

The server 64 coupled to the network 66 is adaptable to include the code build tool 86'. In this manner, a number of users are able to access the code build tool 86' via the network 66 to build or generate source code from a block diagram model with one or more signals having data precision requirements, precision limitations and derivable minimum values or derivable maximum values that vary during execution of the model where the model is free of graphically visible connections to convey such information to blocks in the model. Those skilled in the art will recognize that the computing device 62 includes other software such as other interfaces and other programs, such as one or more OS programs, compilers and various other program applications developed in a variety of programming environments for controlling system software and hardware components.

The illustrative embodiment of the present invention may adopt an object oriented (OO) programming model. In an object oriented programming environment an object is a software artifact that has properties and behaviors. Behaviors are also referred to as functions or methods. Object classes are arranged in a hierarchy with a parent class located at a root of the hierarchy tree with sub-classes extending therefrom. Each sub-class or child class is derived from, and inherits properties and methods from another class such as, a parent class. Thus, an instance of a sub-class is also an instance of its parent class.

Although the illustrative embodiment of the present invention is discussed herein in accordance with the concepts and principles of an object oriented framework those skilled in the art will recognize that the illustrative concepts discussed herein are applicable to other programming frameworks such as structured programming frameworks including C, Fortran and the like, or in hybrid programming frameworks having OO properties and structured properties such as C# or other programming frameworks having OO properties such as aspect-oriented programming.

Figure 3:
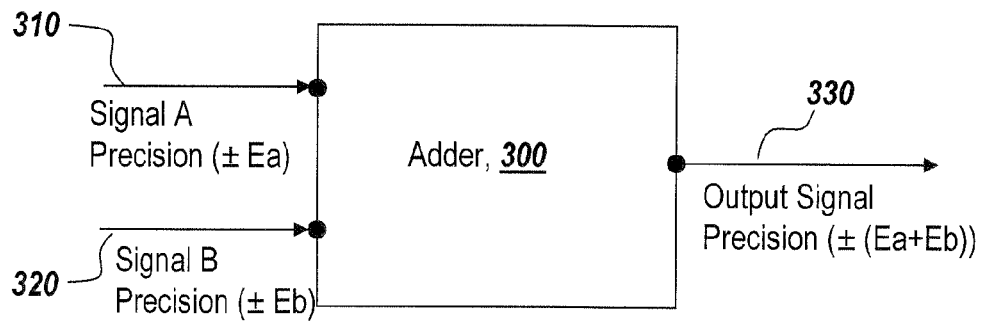
FIG. 3 illustrates a signal with a design precision property in an exemplary graphical modeling environment according to the teachings of the present invention.
Figure 4:
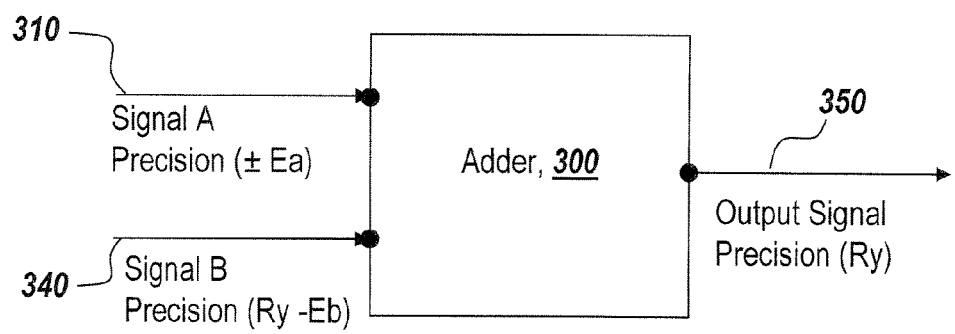
FIG. 4 illustrates a signal with a design precision limitation property in an exemplary graphical modeling environment according to the teachings of the present invention.
Figures 5, 6:
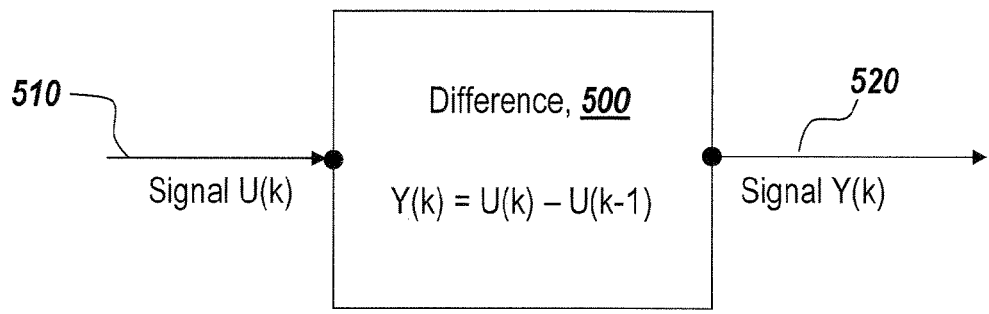
FIG. 5 illustrates a signal with a derivable minimum data value property, a maximum data value property or both in an exemplary graphical modeling environment according to the teachings of the present invention.
FIG. 6 illustrates a table holding exemplary maximum and minimum values for the signal depicted in FIG. 5, according to the teachings of the present invention.

FIGS. 3-5 illustrate the principle of a signal having a design precision requirement, a design precision limitation, derivable minimum value, or derivable maximum value property or properties that is defined or specified to allow the precision, precision limitation, and minimum value, maximum values or both minimum and maximum data values of the signal to be derivable. In the illustrative embodiment of the present invention, signals in the graphical modeling environment 78 are objects belonging to one or more classes.

For example, a class 700 as illustrated in FIG. 7. Class 700 is a parent class of a signal or signal type containing properties and operations. Instantiation of an object of the class 700 represents a signal type, for example, a fixed point signal type includes a property "precision", a property "scaling", a property "minimum value", a property "maximum value", a property "signed", a property "word length", a property "fraction length", and operations defined for reading and writing a value. Those skilled in the art will appreciate that other parent classes can be defined for other signals.

FIGS. 3-5 illustrate how a block created in the graphical modeling environment 78 supports and propagates a signal that represents a signal type having a design precision limitation property, a design precision property, a design discrete derivative maximum value, a derivative data minimum value, or any such combination of properties capable of varying as the block in a block diagram model executes.

Adder block 300 includes a first input port to receive a first signal 310 having a design or derived precision limitation of +/−Ea. The adder block 300 has a second input port to receive a second input signal 320 having a design or derived precision limitation of +/−Eb. The adder block 300 operates on the first signal 310 and the second signal 320 to add a value or values associated with each signal and output a result of the arithmetic operation to produce output signal 330. The adder block 300 is configured to recognize the design or derived precision limitation property of the first signal 310, the design or derived precision limitation property of the second signal 320 and determine or calculate the derived precision limitation property of the output signal 330. That is, the adder block 300 is configurable to determine the precision of the output signal 330 is equal to +/−(Ea+Eb). A block such as adder block 300 can derive the precision limitation of its output using a design precision limitation or by using derived precision limitations. Once the adder block has determined the derived precision limitation for its output, other blocks connected to that signal can use information to derive precision limits for their outputs. In this manner, derivation of precision limits can propagate across a model. Propagation depends on the availability of design precision limit to start the process.

FIG. 4 illustrates how the adder block 300 can determine or limit the precision of an input signal based on a precision property of an output signal, the mathematical operation being performed with the input signal, and the precision of other signals the adder block 300 operates on. In FIG. 4, the adder block 300 has a first input node to receive the first signal 310 having a design or derived precision limitation of +/−Ea and a second input node to receive a second signal 340 having a precision that the adder block 300 modifies based on a configuration and operational characteristics to produce output signal 350. The output signal 350 is produced on the output node by the adder block 300 with a derived precision requirement property Ry. The adder block 300 is configurable to determine, modify, or limit the precision requirement property of the second signal 340 by subtracting the precision limitation property +/−Ea of the first signal 310 from the precision requirement property Ry of the output signal 350 to determine the precision requirement property for the second signal 340 on which the adder block 300 operates to produce the output signal 350.

The adder block 300 is configurable to increase the precision of the second signal 340 using lower precision values and keep additional higher precision values or bits in order to prevent jitter and downstream calculations. Additionally, the adder block 300 is configurable to determine if a precision limitation for a signal is larger than the precision requirement and can take an action to provide a notice to a user of the graphical modeling environment 78 if such an event should occur. For example, if the second signal 340 has a precision limitation, that is, a property which indicates the adder block 300 is to use 16 bits of data to calculate the output signal 350 yet the second signal 340 has a maximum precision of 8 total bits, the adder block 300 can take an action to notify the user.

FIG. 5 illustrates another exemplary block created in the graphical modeling environment 78 that supports and propagates a signal having a derived maximum value property, a derived minimum value property, or both. The block in FIG. 5 is discussed in connection with Table 1 of FIG. 6.

Block 500 operates as a difference block to output a current input value minus the previous input value. The difference block 500 includes a first input port to receive the first signal 510 and an output port to propagate output signal 520. Table 1 illustrates the first signal 510 is defined to have a design or derived maximum value property of +140 and a design or derived minimum data value property of −40. Based on that information alone, a worst case analysis on the first signal 510, would obtain a derived minimum and maximum of −180 to +180, respectively. However, if the first signal 510 has a data value that does not change rapidly such as, a signal holding a data value representing the temperature of an engine block, the difference block 500 can obtain a less conservative but more accurate derived new maximum data value property and derive a new minimum data value property for the first signal 510. For example, if the first signal 510 has a first derivative limit of +/−40 per second, which the block 500 can either determine or such information can be provided to the difference block 500 and the difference block 500 produces the output signal 520 every 0.25 seconds, then, in turn, the difference block 500 can determine from this information that the maximum data value property for the first signal 510 is +10 and derive that the minimum data value property has a value of −10. The ability to derive maximum and minimum data values in this manner helps improve operational performance of a model. For example, this data enables improved selection of fixed point scaling that does not waste bits on range that is unreachable.

As was mentioned above, the illustrative embodiment also provides some enhanced instrumentation. This instrumentation can be explained with reference to FIG. 5. When a simulation is running in the graphical modeling environment 78 for the first signal 510, a sufficient number of prior values can be stored. From these prior values, the current value, the time step, and the discrete derivatives can be determined. For example, to compute the first derivative, one prior value of the first signal 510 would need to be stored and the derivative would be computed as dU(k)=(U(k)−U(k−1))/tsample.

FIGS. 3-6 illustrate the principle of a signal having a design precision limitation, a design precision requirement, a derivable upper limit, derivable lower limit or a derivable representable maximum and minimum property or a combination of such properties. In the illustrative embodiment of the present invention, signals in the graphical modeling environment 78 are objects belonging to one or more classes. For example, a class 700 as illustrated in FIG. 7. Class 700 is a parent class of a signal or signal type containing properties and operations. Instantiation of an object of the class 208 represents a signal type, for example, a fixed point signal type that includes a property "data precision" and operations defined for reading and writing a data value. Those skilled in the art will appreciate that other parent classes can be defined for other signals having a data precision, a precision requirement, a precision limitation, a derivable lower limit, a derivable upper limit, or a derivable representable maximum and minimum.

Figure 8:
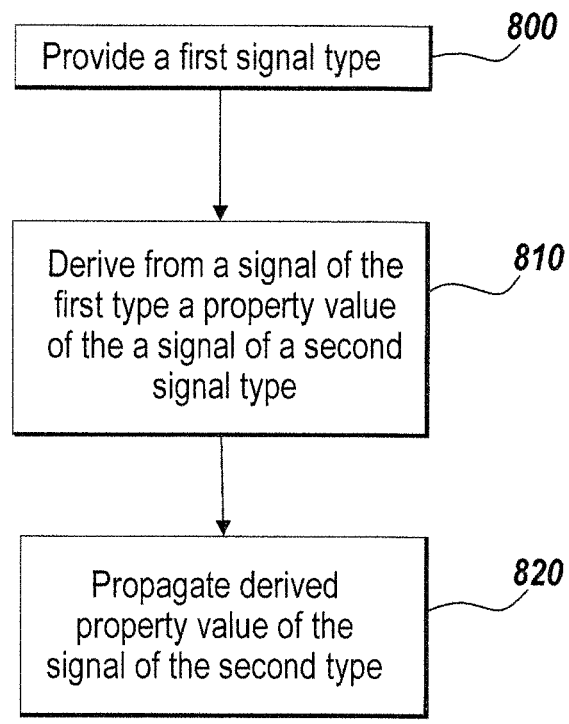
FIG. 8 is a block flow diagram illustrating steps taken in practicing the teachings of the present invention.

FIG. 8 illustrates steps taken to practice one illustrative embodiment of the present invention. In step 800, the graphical modeling environment 78 provides a first signal type having a data value associated with a precision property, a design precision limitation property, a data value range property, a data value minimum value property, a design maximum value property or any combination of such properties.

In step 810, a model in the graphical modeling environment 78 while executing, derives from a signal of the first signal type a property value of a signal of a second signal type. For example, the adder block 300 and the difference block 500 discussed above in relation to FIGS. 3-6. In step 820, the model propagates the derived property value of the signal of the second signal type. The model can propagate the derived property value during execution or during compilation of the model.

Figure 9:
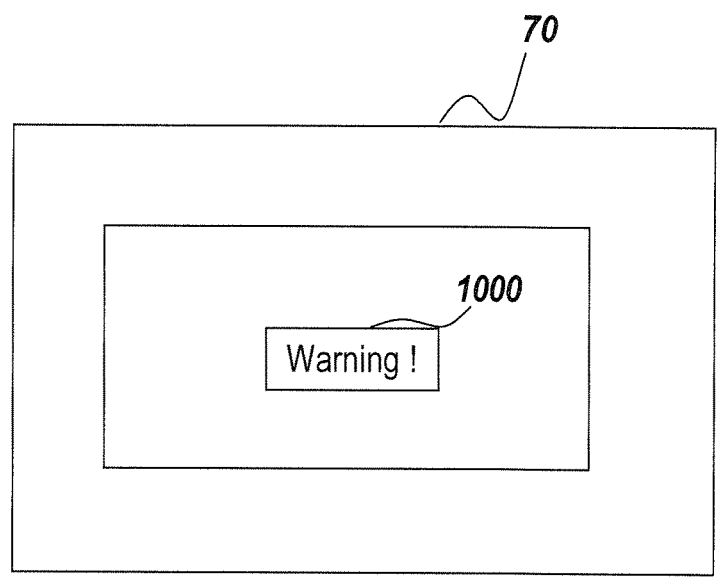
FIG. 9 is an exemplary notice of a potential error in accordance with the teachings of the present invention.

FIG. 9 illustrates an exemplary notice or indicator provided to the user of a model in the graphical modeling environment 78 in accordance with the teachings of an illustrative embodiment of the present invention. As discussed above in relation to FIGS. 3-6 the principle of a signal and a block having a precision related property that is defined and that can be used to provide a user with one or more indicators to warn of a potential error in a downstream calculation based on current property settings. For example, a block in accordance with the present invention using both preset precision limitation property and derived precision limitation property information can automatically determine aspects of a signals data type and scaling. For example, if the precision of a signal is known to be limited to +/−2×10$^{-7}$, then a waste of resources in terms of bits of precision is to have a fraction length greater than 6 bits.

A block or a tool in the graphical modeling environment 78 in accordance with the present invention could automatically set the scaling or fraction length of a signal based on the precision limitations and other user options. For example, the user may want the option of adding extra bits of fraction length to prevent jitter in downstream calculations. Once the fraction length is known, then if the range is known, the word length can automatically be derived by the tool or a block in accordance with the teachings of the present invention.

Further, in accordance with the teachings of the present invention, the predefined settings of a precision requirement property and those settings derived through propagation of a signal can be used to automatically determine portions of data type and scaling setting properties for that signal. For example, if the precision is required to be at least +/−2×10$^{-5}$ then, at a minimum, the fraction length must be set to 4 and the scaling be set to 2×10$^{-4}$. This minimum fraction length assumes the answer is perfectly rounded to the nearest values hence, an error limit of 2×10$^{-5}$. Based on user options, the two could automatically add extra bits of fraction length to account for imperfect rounding. The extra fraction length could also help prevent jitter in downstream calculations.

Additionally, in accordance with the teachings of the present invention, a tool or block of the graphical modeling environment 78 can, based on the data type of a signal that was predefined or a data type that resulted from data type propagation that block or tool can determine that a precision requirement of a signal can not be met and notify or warn a user of such an event or condition.

In operation, once a user has defined or specified the properties of the signal in the graphical modeling environment 78, the compiling of the block diagram model evaluates the signal and block properties and parameters, and propagates the signal properties to each of the blocks in the block diagram model. As such, during compilation, information is given or made available to each block that identifies a location for the data associated with the signal, as well as given precision characteristics, and derivable value limits for that signal.

In another embodiment of the present invention, the requirement/constraint solver 83 is able to monitor related signal properties, requirements, limitations, or constraints on two or more signal types. In this manner, when a change or modification is made to one of the related signal properties, requirements, limitations, or constraints by an overseer of the model or modeling process the requirement/constraint solver 83 can detect that change, monitor the other related signal property, constraint, limitation, or requirement and notify the overseer if no change is detected. As such, the requirement/constraint solver 83 assists the overseer in tracking changes to related signal properties, requirements, limitations, or constraint on two different signal types to avoid possible induced modeling errors caused by human error when only one related signal property, constraint, or requirement is changed and the other related signal property, constraint, limitation, or requirement goes unchanged.

Figure 10:
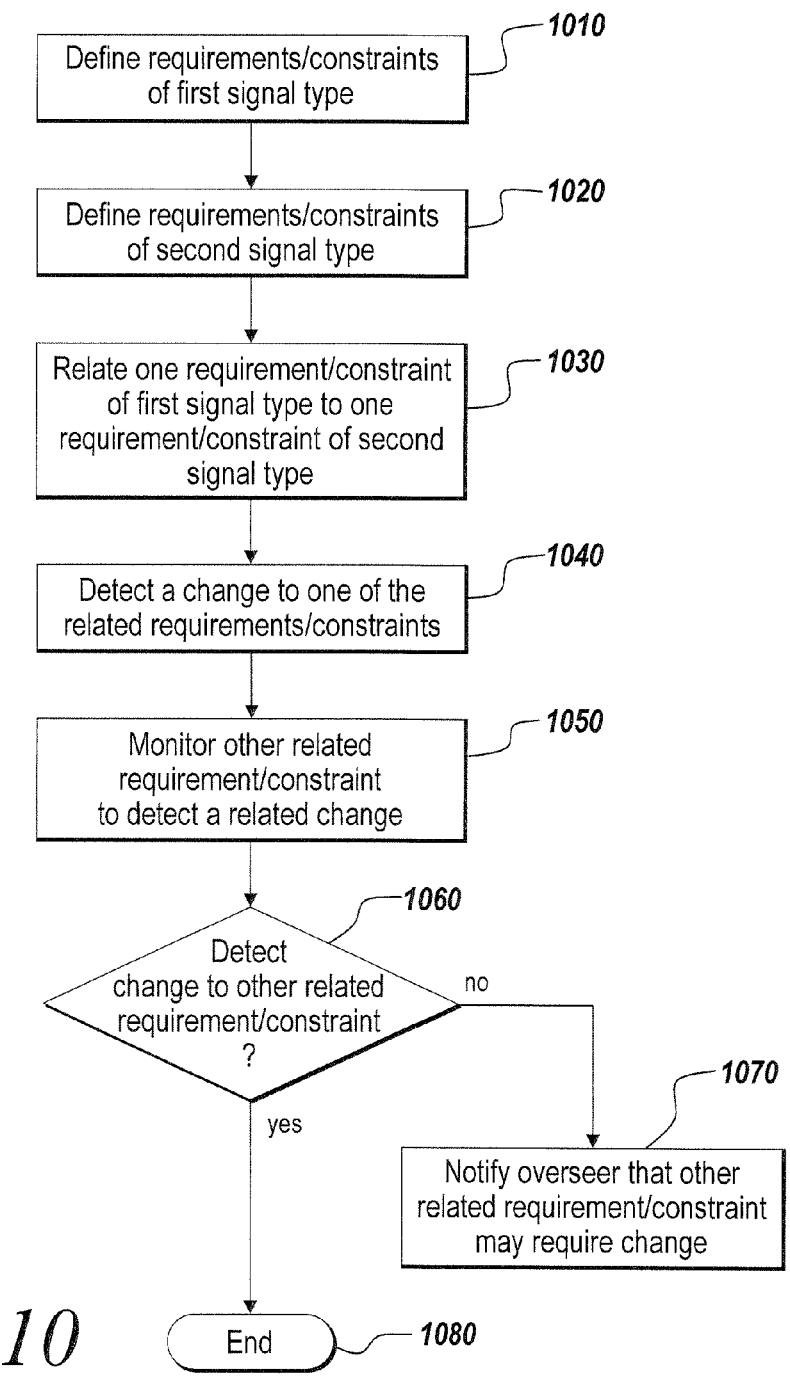
FIG. 10 are a block flow diagram illustrating steps taken in practicing the teachings of the present invention.

FIG. 10 depicts steps taken to practice this illustrative embodiment of the present invention. In step 1010, an engineer or scientist defines the properties, limitations, constraints, or requirements of a first signal type in a model. In step 1020, the engineer or scientist defines the properties, limitations, constraints, or requirements of a second signal type in the model. The engineer can use the interface 80 to define or specify the properties, limitations, constraints, or requirements of the two signal types and relate some or all of the properties, limitations, constraints, or requirements of the two signal types.

In step 1030, the engineer or scientist relates some or all of the properties, limitations, constraints or requirements of the first signal type to some or all of the properties, limitations, constraints or requirements of the second signal type. By relating the properties, limitations, requirements or constraints of two different signal types the requirement/constraint solver 83 is informed of the relationship and can begin at that point or at any point thereafter to monitor the related properties, limitations, requirements or constraints of two or more signals, detect a change in one of the properties, limitations, requirements or constraints, monitor the other related property, limitation, requirement or constraint and notify the engineer or scientist if the other related property, requirement or constraint goes unchanged.

In step 1040, the requirement/constraint solver 83 detects a change to one of the related properties, limitations, requirements or constraints. In step 1050, the requirement/constraint solver 83 monitors the other related properties, limitations, requirements or constraints as defined or specified by the engineer or scientist to detect a related change. In step 1060, if the requirement/constraint solver 83 detects a suitable change to the other related properties, requirements, limitations, or constraints the process ends at step 1080. If, in step 1060, the requirement/constraint solver 83 fails to detect a change to the other related properties, limitations, requirements or constraints then in step 1070, the requirement/constraint solver 83 notifies the engineer or scientist through the interface 80 that the one of the other related properties, limitations, requirements or constraints of the other signal type remains unchanged and may need modification.

Once the engineer or scientist is notified, for example, such as the warning 1000 depicted in FIG. 9 the engineer or scientist can modify the related property, requirement, limitation, or constraint of the other signal type. Additionally, the engineer or scientist can, if desired, override the warning provided by the requirement/constraint solver 83 and proceed to execution of the model without modifying or changing the other related property, limitation, requirement or constraint of the other signal type.

In operation, the requirement/constraint solver 83 can monitor the related properties, limitations, requirements and constraints up to the point when the engineer, scientist or other entity such as another model or other executable program initiates execution of the model containing the related signal properties, limitations, requirements or constraints being monitored by the requirement/constraint solver 83.

The requirement/constraint solver 83 is configurable to have a number of architectures that include, but are not limited to a rule based system, model-based system, a case based system that adapts to previous case experiences and other like architectures such as neural systems and the like.

Figures 11, 12, 13, 14:
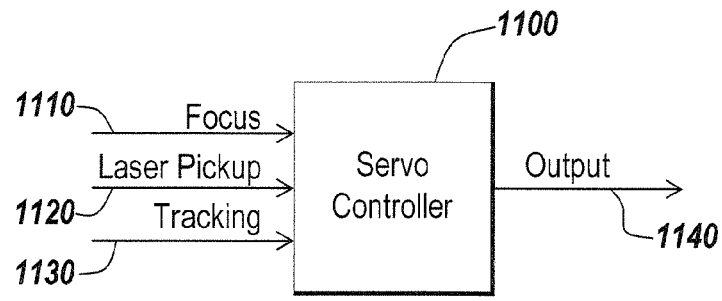
FIG. 11 is an exemplary block from a modeling process in accordance with the teachings of the present invention.
FIG. 12 is an exemplary representation of signal properties of a first signal type in accordance with the teachings of the present invention.
FIG. 13 is an exemplary representation of signal properties of a second signal type in accordance with the teachings of the present invention.
FIG. 14 is an exemplary representation of signal properties of a third signal type in accordance with the teachings of the present invention.

FIG. 11 illustrates one exemplary block in a model from the graphical modeling environment 78 that operates on two different signal types that have a related property, limitation, requirement or constraint. As such, the requirement/constraint solver 83 can monitor and detect when a change or modification occurs to one or more of the related signal properties, limitations, requirements or constraints.

The servo controller block 1100 is an exemplary block and one possible application for the servo controller block 1100 is to form a portion of a system having a servo motor such as, a CD player or DVD player. Those skilled in the art will appreciate the servo controller block 1100 is merely illustrative and is meant to facilitate one of the teachings of the present invention and is not meant to limit the teachings of the present invention. The servo controller block 1100 receives as input three different signal types and outputs a fourth signal type. The servo controller block 1100 receives a first signal type 1110 having a signal name focus, receives a second signal type 1120 having a signal name laser pickup and receives a third signal type 1130 having a signal name tracking. The output signal produced by the servo controller block 1100 is a fourth signal type 1140 having a signal name output.

Those skilled in the art will appreciate that when designing or modeling a CD player or a DVD player the focal length of the laser can be related to the mass or weight of the laser pickup and likewise the tracking of the laser pickup can be related to the mass or weight of the laser pickup. As such, it is desirable to relate one or more properties, limitations, requirements or constraints of the second signal type 1120 with one or more properties, limitations, requirements or constraints of the first signal type 1110 and one or more properties, limitations, requirements or constraints of the third signal type 1130. For example, it is desirable to relate a mass property of the second signal type 1120 with a focal length property of the first signal type 1110 and with a tracking property of the third signal type 1130. In this manner, if the engineer or scientist designing or modeling the CD player or the DVD player changes the value of the mass property of the second signal type 1120 the requirement/constraint solver 83 can detect the value change to the mass property and monitor the focal length property of the first signal type 110 and the tracking property of the third signal type 1130.

As such, if the engineer or scientist specifies to the requirement/constraint solver 83 that the focal length of the first signal type 1110 is related to the mass of the second signal type 1120 and is likewise related to the tracking of the third signal type 1130 a change or modification to any of those properties, limitations, requirements or constraints will cause the requirement/constraint solver 83 to monitor the other related properties, limitations, requirements or constraints of the other signal types to detect a change or modification in the related properties, limitations, requirements or constraints. In this manner, modeling accuracy is improved and the reduction of induced modeling errors due to changes in property, requirement or constraint values between related signal types is reduced.

FIG. 12 depicts the properties, the limitations, the requirements or the constraints of the first signal type 1110. The first signal type 1110 has a signal name property, a data type property and a focal length property. Those skilled in the art will appreciate the first signal type 1110 can have other signal properties, requirements and constraints and that those illustrated are meant to facilitate explanation of the teachings of the present invention and are not meant to limit the teachings of the present invention.

FIG. 13 depicts the signal properties, the limitations, the requirements or the constraints of the second signal type 1120. The second signal type 1120 includes a signal name property type, a data type property and a mass property. Those skilled in the art will appreciate the second signal type 1120 can have other signal properties, limitations, requirements and constraints and that those illustrated are meant to facilitate explanation of the teachings of the present invention and are not meant to limit the teachings of the present invention.

FIG. 14 depicts signal properties, the requirements or the constraints of the third signal type 1130. The third signal type 1130 includes a signal name property, a data type property and a tracking speed property. Those skilled in the art will appreciate the depiction of the third signal type 1130 is meant to facilitate explanation of the teaching of the present invention is and is not meant to limit the teachings of the present invention to a signal type having such signal properties, limitations, requirements and constraints.

The present invention allows implementation of signals as objects or other structures whose properties are interpreted differently based on processing requirements of a block in a graphical modeling environment. As such, each block in the environment can propagate a received signal type with its associated precision requirement, a precision limitation or, a derivable maximum and minimum, carry out one or more operations on the data of the received signal type to modify the precision requirement, a precision limitation or, a derivable maximum and minimum data dimensions of the data to output a signal with the same or different data precision requirement, a precision limitation, a derivable lower limit, a derivable upper limit, or a derivable range of a fixed point data value data then the received signal. To accomplish these benefits the interface 80 operates in conjunction with the graphical model environment 78 to assist in the management, and interpretation of the objects representing signals.

While the present invention has been described with reference to an illustrative embodiment thereof, one skilled in the art will appreciate that there are changes in form and detail that may be made without departure from the intended scope of the present invention as defined in the pending claims. For example, the interface 80 can be implemented programmatically or implemented as a graphical user interface or as a command line interface or other like interface. Furthermore, those skilled in the art will appreciate that concepts discussed herein are equally applicable to time based graphical modeling environments; data flow based graphical modeling environments; discrete event based graphical modeling environments, and other like graphical modeling environments.

What is claimed is:

1. A method comprising:
   receiving, by a computing device and from a user, information defining at least one of a first precision requirement or a first precision limitation of a first signal type of a first signal of a model, the first precision requirement identifying a level of accuracy required for values of the first signal, the first precision limitation identifying a limitation regarding a rate of change for the values of the first signal;

receiving, by the computing device and from the user, information defining at least one of a second precision requirement or a second precision limitation of a second signal type of a second signal of the model, the second precision requirement identifying a level of accuracy required for values of the second signal, the second precision limitation identifying a limitation regarding a rate of change for the values of the second signal;

receiving, by the computing device and from the user, information indicating that the at least one of the first precision requirement or the first precision limitation is related to the at least one of the second precision requirement or the second precision limitation;

detecting, by the computing device, a change in the at least one of the first precision requirement or the first precision limitation;

determining, by the computing device, whether the change has been propagated to the at least one of the second precision requirement or the second precision limitation; and notifying, by the computing device, the user that the at least one of the second precision requirement or the second precision limitation is to be changed when the change has not been propagated to the at least one of the second precision requirement or the second precision limitation.

2. The method of claim 1, further comprising:
receiving the first signal on an input port of a block in the model,
the model corresponding to a graphical model; and
setting, in the block, a format of one or more values of the second signal based on a precision property value associated with the at least one of the first precision requirement or the first precision limitation.

3. The method of claim 2, where the format includes a scaling property defining at least one of a slope or bias representing the one or more values of the second signal.

4. The method of claim 2, where the format includes a fraction length property defining a fraction length of the one or more values of the second signal.

5. The method of claim 2, where the format includes a range property defining limits on a representation of the one or more values of the second signal.

6. The method of claim 2, further comprising:
determining, in the block, a word length for the one or more values of the second signal.

7. The method of claim 2, further comprising:
determining a precision of an arithmetic operation performed in the graphical model,
where the precision of the arithmetic operation is associated with the at least one of the second precision requirement or the second precision limitation, and
where a result of the arithmetic operation includes the one or more values of the second signal; and
automatically setting a format of a fixed point data type value based on the precision of the arithmetic operation and a value of a precision property associated with the at least one of the second precision requirement or the second precision limitation.

8. The method of claim 2, further comprising:
receiving, on an input of the block, the first signal; and
in the block, determining whether the precision property value, associated with the at least one of the first precision requirement or the first precision limitation, falls outside a requirement of a precision property associated with the at least one of the second precision requirement or the second precision limitation,
where the requirement, associated with the at least one of the second precision requirement or the second precision limitation, identifies a difference between successive values of the first signal.

9. The method of claim 8, further comprising:
reporting, to the user, a result of determining whether the precision property value, associated with the at least one of the first precision requirement or the first precision limitation, falls outside the requirement of the precision property associated with the at least one of the second precision requirement or the second precision limitation.

10. The method of claim 2, where the graphical model is a time-based graphical model.

11. The method of claim 1, where the first signal type is a fixed point data type.

12. The method of claim 1, further comprising:
deriving a precision property value, associated with the at least one of the second precision requirement or the second precision limitation, using data-type propagation in a graphical modeling environment.

13. A non-transitory computer readable medium storing instructions, the instructions comprising:
a plurality of instructions which, when executed by a computing device, cause the computing device to:
receive, from a user, information identifying at least one of a first precision requirement or a first precision limitation for a first signal type for a first signal,
the first precision requirement identifying a level of accuracy required for at least one value of the first signal,
the first precision limitation identifying a limitation regarding a rate of change for the at least one value of the first signal;
receive, from the user, information identifying at least one of a second precision requirement or a second precision limitation of a second signal type of a second signal,
the second precision requirement identifying a level of accuracy required for at least one value of the second signal,
the second precision limitation identifying a limitation regarding a rate of change for the at least one value of the second signal;
receive information indicating that the at least one of the first precision requirement or the first precision limitation is related to the at least one of the second precision requirement or the second precision limitation;
detect a first change in the at least one of the first precision requirement or the first precision limitation;
determine whether a second change has occurred in the at least one of the second precision requirement or the second precision limitation,
the second change being related to the first change; and
notify the user that the at least one of the second precision requirement or the second precision limitation is to be changed when the second change has not occurred in the at least one of the second precision requirement or the second precision limitation.

14. The medium of claim 13, where the instructions further comprise:
one or more instructions to receive the first signal on an input port of a block in a graphical model; and
one or more instructions to set, in the block, a format of values of the second signal based on a precision property value associated with of the at least one of the first precision requirement or the first precision limitation.

15. The medium of claim 14, where the format includes a scaling property defining at least one of a slope or bias representing the values of the second signal.

16. The medium of claim 14, where the format includes a fraction length property defining a fraction length of the values of the second signal.

17. The medium of claim 14, where the format includes a range property defining limits on a representation of the values of the second signal.

18. The medium of claim 14, where the instructions further comprise:
one or more instructions to determine, in the block, a word length for the values of the second signal.

19. The medium of claim 14, where the instructions further comprise:
one or more instructions to determine a precision of an arithmetic operation performed in the graphical model,
where the precision of the arithmetic operation is associated with the at least one of the second precision requirement or the second precision limitation, and
where a result of the arithmetic operation includes the values of the second signal; and
one or more instructions to automatically set a format of a fixed point data type value based on the precision of the arithmetic operation and a precision property associated with the at least one of the second precision requirement or the second precision limitation.

20. The medium of claim 14, where the instructions further comprise:
one or more instructions to receive, on an input of the block, the first signal; and
one or more instructions to determine, in the block, whether a precision property value, associated with the at least one of the first precision requirement or the first precision limitation, falls outside a requirement of a precision property associated with the at least one of the second precision requirement or the second precision limitation,
where the requirement, of the precision property associated with the at least one of the second precision requirement or the second precision limitation, identifies a difference between successive values of the first signal.

21. The medium of claim 20, where the instructions further comprise:
one or more instructions to report, to the user, a result of determining whether the precision property value, associated with the at least one of the first precision requirement or the first precision limitation, falls outside the requirement of the precision property associated with the at least one of the second precision requirement or the second precision limitation.

22. The medium of claim 13, where the first signal type is a fixed point data type.

23. A computing device comprising:
a processor to:
define a first signal type for a first signal,
the first signal type identifying at least one of a first precision requirement or a first precision limitation,
the first precision requirement identifying a level of accuracy required for values of the first signal, and
the first precision limitation identifying a limitation regarding a rate of change for the values of the first signal;
define a second signal type for a second signal,
the second signal type identifying at least one of a second precision requirement or a second precision limitation,
the second precision requirement identifying a level of accuracy required for values of the second signal, and
the second precision limitation identifying a limitation regarding a rate of change for the values of the second signal;
receive information indicating that the at least one of the first precision requirement or the first precision limitation is related to the at least one of the second precision requirement or the second precision limitation;
detect a first change in the at least one of the first precision requirement or the first precision limitation;
determine whether a second change has occurred in the at least one of the second precision requirement or the second precision limitation,
the second change being related to the first change; and
notify the user that the at least one of the second precision requirement or the second precision limitation is to be changed when the second change has not occurred in the at least one of the second precision requirement or the second precision limitation.

24. The computing device of claim 23, where a display device provides, for display, a graphical model that includes the first signal and the second signal,
the display device being associated with the computing device.

25. The computing device of claim 24, where the graphical model includes a block for processing the first signal of the first signal type, and
where the second signal of the second signal type is outputted at a port of the block based on the first signal being processed.

26. The computing device of claim 23, where the processor is further to:
notify the user when a precision property value, associated with the at least one of the second precision requirement or the second precision limitation, conflicts with another precision property value associated with the at least one of the second precision requirement or the second precision limitation associated with another signal in a graphical model,
the graphical model being associated with the first signal and the second signal.

27. The computing device of claim 23, where the processor is further to:
notify the user when a precision property value, associated with the at least one of the second precision requirement or the second precision limitation, cannot be achieved by a graphical model in a graphical model environment.

28. The computing device of claim 23, where the first signal type is a fixed point data type.

29. A method comprising:
defining, by a computing device, information relating to a first signal type for a first signal of a graphical model in a graphical modeling environment,
a property, of the first signal type, including:
a precision requirement identifying a level of accuracy required for values of the first signal,
a precision limitation identifying a limitation regarding a rate of change for the values of the first signal,
a maximum value for the first signal, and
a minimum value for the first signal,
the property of the first signal type being specified by a user;
defining, by the computing device, information relating to a second signal type for a second signal,
a property, of the second signal type, including:
a second precision requirement identifying a level of accuracy required for values of the second signal, and
a second precision limitation identifying a limitation regarding a rate of change for the values of the second signal,
the property of the second signal type being defined by the user;
detecting, by the computing device, a change in the property of the first signal type based on deriving a third precision requirement for the values of the first signal, a third precision limitation identifying a limitation regarding a rate of change for the values of the first signal, a second maximum value for the first signal, or a second minimum value for the first signal,
the third precision requirement, the third precision limitation, the second maximum value, or the second minimum value being derived based on values associated with the first signal type observed during propagation of the first signal in the graphical model; and
notifying, by the computing device, the user that the property of the second signal type is to be changed when the property of the second signal type has not changed after detecting the change in the property of the first signal type.

30. The method of claim 29, further comprising:
receiving the first signal at an input of the block in the graphical model; and
deriving the first maximum value for the first signal in the graphical model based on the received first signal.

31. The method of claim 29, further comprising:
receiving the first signal at an input of the block in the graphical model; and
deriving the first minimum value for the first signal in the graphical model based on the received first signal.

32. The method of claim 29, further comprising:
storing a plurality of values of the first signal that are generated during an execution of the graphical model;
identifying a time interval between a generation of a first value of the plurality of values and a generation of a second value of the plurality of values; and
determining at least one of the first maximum value for the first signal or the first minimum value for the first signal based on the plurality of values and the time interval.

33. The method of claim 29, further comprising:
storing a plurality of minimum values, for the first signal, derived during an execution of the graphical model;
identifying a time interval between a deriving of a minimum value of the plurality of minimum values and a deriving of another minimum value of the plurality of minimum values; and
determining a revised minimum value for the first signal based on the plurality of the minimum values and the time interval.

34. The method of claim 29, further comprising:
receiving the first signal at an input of a block in the graphical model;
identifying the first maximum value and the first minimum value based on the received input; and
setting a range for the first signal based on the identified maximum first value and the identified first minimum value.

35. The method of claim 29, further comprising:
determining a precision for a value of the first signal based on one or more operational characteristics of the graphical model.

36. The method of claim 35, further comprising:
determining a word length of at least one of the first maximum value or the first minimum value.

37. The method of claim 35, further comprising:
determining a fraction length of at least one of the maximum value or the minimum value.

38. The method of claim 29, where the graphical model is a time-based graphical model.

39. The method of claim 29, where the graphical modeling environment derives at least one of the first maximum value or the minimum first value for the first signal using data-type propagation in the graphical modeling environment.

40. A non-transitory computer readable medium storing instructions, the instructions comprising:
a plurality of instructions which, when executed by a computing device, cause the computing device to:
define information relating to a first signal type for a first signal of a graphical model,
a property, of the first signal type, including a plurality of:
a precision requirement identifying a level of accuracy required for values of the first signal,
a precision limitation identifying a limitation regarding a rate of change for the values of the first signal,
a maximum value for the first signal, or
a minimum value for the first signal,
the property of the first signal type being specified by a user;
define information relating to a second signal type for a second signal,
a property, of the second signal type, including:
a second precision requirement identifying a level of accuracy required for values of the second signal, and
a second precision limitation identifying a limitation regarding a rate of change for the values of the second signal,
the property of the second signal type being defined by the user;
detect a change in the property of the first signal type based on a third precision requirement for the values of the first signal, a third precision limitation identifying a limitation regarding a rate of change for the values of the first signal, a second maximum value for the first signal, or a second minimum value for the first signal,
the third precision requirement, the third precision limitation, the second maximum value, or the second minimum value being derived based on values observed during propagation of the first signal in the graphical model; and notify the user that the property of the second signal type is to be changed when the property of the second signal type has not changed after detecting the change in the property of the first signal type.

41. The medium of claim 40, where the instructions further comprise:
one or more instructions to receive the first signal at an input of a block in the graphical model; and
one or more instructions to derive the first maximum value for the first signal in the graphical model based on the received first signal.

42. The medium of claim 40, where the instructions further comprise:
one or more instructions to receive the first signal at an input of the block in the graphical model; and
one or more instructions to derive the first minimum value for the first signal in the graphical model based on the received first signal.

43. The medium of claim 40, where the instructions further comprise:
one or more instructions to store a plurality of values, of the first signal, generated during an execution of the graphical model;
one or more instructions to identify a time interval between a generation of a first value of the plurality of values and a generation of a second value of the plurality of values; and
one or more instructions to determine at least one of the first maximum value for the first signal or the first minimum value for the first signal based on the plurality of values and the time interval.

44. The medium of claim 40, where the instructions further comprise:
one or more instructions to store a plurality of minimum values, of the first signal, that are derived during an execution of the graphical model;
one or more instructions to identify a time interval between a deriving of a minimum value of the plurality of minimum values and a deriving of another minimum value of the plurality of minimum values; and
one or more instructions to determine a revised minimum value for the signal based on the plurality of the minimum values and the time interval.

45. The medium of claim 40, where the instructions further comprise:
one or more instructions to receive the first signal at an input of a block in the graphical model;
one or more instructions to identify the first maximum value and the first minimum value based on the received input; and
one or more instructions to set a range for the first signal based on the identified first maximum value and the identified first minimum value.

46. The medium of claim 40, where the instructions further comprise:
one or more instructions to determine a precision value for a value of the first signal based on one or more operational characteristics of the graphical model.

47. The medium of claim 46, where the instructions further comprise:
one or more instructions to determine a word length of at least one of the first maximum value or the first minimum value.

48. The medium of claim 46, where the instructions further comprise:
one or more instructions to determine a fraction length of at least one of the first maximum value or the first minimum value.

49. A device comprising:
a processor to:
define information relating to a first signal type for a first signal of a graphical model,
a property, of the first signal type, including a plurality of:
a precision requirement identifying a level of accuracy required for values of the first signal,
a precision limitation identifying a limitation regarding a rate of change for the values of the first signal,
a maximum value for the first signal, or
a minimum value for the first signal,
the property of the first signal type being specified by a user;
define information relating to a second signal type for a second signal,
a property, of the second signal type, including:
a second precision requirement identifying a level of accuracy required for values of the second signal, and
a second precision limitation identifying a limitation regarding a rate of change for the values of the second signal,
the property of the second signal type being defined by the user;
detect a change in the property of the first signal type based on a third precision requirement for the values of the first signal, a third precision limitation identifying a limitation regarding a rate of change for the values of the first signal, a second maximum value for the first signal, or a second minimum value for the first signal,
the third precision requirement, the third precision limitation, the second maximum value, or the second minimum value being derived based on values observed during propagation of the first signal in the graphical model; and
notify the user that the property of the second signal type is to be changed when the property of the second signal type has not changed after detecting the change in the property of the first signal type.

50. The device of claim 49, where a display device provides, for display, a graphical model having the first signal type.

51. The device of claim 49, where the processor is further to:
provide a block having a structure and operation for processing the first signal of the first signal type; and
derive, using the block, at least one of the first maximum value or the first minimum value based on one or more values observed during propagation of the first signal in the graphical model and based on a temporal observation of the first signal.

* * * * *